April 29, 1969    E. M. TRAMMELL, JR    3,441,012

INTERNAL COMBUSTION ENGINE

Filed June 3, 1968

Inventor
EARL M. TRAMMELL, JR.

By Cohn and Powell
Attorneys

United States Patent Office 3,441,012
Patented Apr. 29, 1969

3,441,012
INTERNAL COMBUSTION ENGINE
Earl M. Trammell, Jr., La Due, Mo.
(EMT Enterprises, Box 435, St. Louis, Mo. 63166)
Continuation-in-part of application Ser. No. 564,195, July 11, 1966. This application June 3, 1968, Ser. No. 734,163
Int. Cl. F01b 9/02; F16h 21/16
U.S. Cl. 123—197                          13 Claims

ABSTRACT OF THE DISCLOSURE

A crankshaft and piston assembly in an internal combustion engine that permits a substantial reduction in connecting rod lengths for piston-operating engines. The asssembly has an oblong piston reciprocatively mounted in a compatible oblong cylinder, and a connecting rod oscillatively mounted and connected to a crankarm bearing that is located closely adjacent the bottom of the oblong piston immediately below a wrist pin when the crankarm bearing is in the DTC (deed top center) position. The wrist pin, carried by and extending transversely of the oblong piston, oscillatively mounts and connects the rod to the piston, the wrist pin being located close to the bottom of the piston. The piston is recessed on opposite transverse sides to pass the crankarm bearing, and moves between spaced arms of the crankarm upon crankshaft rotation. This assembly provides the shortest possible effective connecting rod length using a conventional type of connecting rod. The distance between the center axes of the wrist pin and crankarm bearing is greater than the distance between the center axes of the crankarm bearing and the crankshaft. Furthermore, the center axis of the wrist pin is located between the center axis of the crankarm bearing and the top of the piston at all times during rotation of the crankshaft.

Background of the invention

This application is a continuation-in-part of copending application 564,195 filed July 11, 1966, now U.S. Patent No. 3,386,429 issued June 4, 1968.

This invention relates generally to improvements in an internal combustion engine, and more particularly to an improved crankshaft and piston design that permits a substantially reduced connecting rod length for piston-operating engines.

In heretofore conventional engines with average 6-inch connecting rods and with 3- or 4-inch strokes, maximum pressures occur at approximately 20° past DTC of the power stroke. Maximum accelerated piston travel occurs, and 100% of piston thrust is transmitted into torque at approximately 75° past DTC.

The crankshaft assembly in copending U.S. Patent No. 3,386,429 permits maximum reduction in effective connecting rod lengths so as to gain greater torque and engine efficiency. However, that crankshaft assembly uses a circular connector bearing rather than the conventional type connecting rod.

Summary of the invention

There are two distinct and important advantages attained by the present improved crankshaft mechanism that effects a short connecting rod, namely: (1) the torque is increased, and (2) the piston speed is increased during maximum pressures of the power stroke.

It is obviously advantageous to boost the engine torque without increasing the bore area or the length of stroke. Equally advantageous, especially for high compression engines, is to have the piston travel or speed at its maximum during maximum pressures of the power stroke because there is a more efficient transmittal of thermal energy into mechanical energy or power. Very important, is that this condition permits the use of higher compression ratios.

In the subject crankshaft mechanism, maximum accelerated piston travel occurs, and 100% of piston thrust is transmitted into torque at approximately 50° past DTC. Therefore, it will be understood that the subject crankshaft mechanism will more efficiently utilize the greater piston pressures which occur at approximately 20° past DTC of the power stroke. Also, it can be shown, strokes being equal, that the new crankshaft mechanism will provide from 40% or more torque from 1° to about 50° of the power stroke than that of the heretofore conventional engines.

This internal combustion engine has a cylinder in which a compatible oblong piston is reciprocatively mounted. A short connecting rod is oscillatively mounted to a crankarm, and a wrist pin oscillatively mounts and connects the rod to the piston, the crankarm bearing being located closely adjacent the bottom of the piston immediately below the wrist pin when the crankarm bearing is located in the DTC position. In addition, the wrist pin is located closely adjacent the bottom of the piston. This structural arrangement provides a conventional type of connecting rod that approaches the shortest possible length.

The new crankshaft assembly and piston construction positions the crankarm bearing at the closest possible distance to the base of the piston, preferably at a minimum clearance, thus making for a more compact engine. Conventional engines cannot accomplish this advantageous result because such engines must maintain adequate space (usually several inches) between the crankarm bearing and the piston base in order to preclude the crankarm bearing from striking the sides of the piston and cylinder walls.

The crankarm includes a pair of spaced arms between which the crankarm bearing extends and to which the crankarm bearing is fixed. The oblong piston is recessed adjacent the wrist pin to receive and pass the crankarm bearing upon crankshaft rotation, and the arms of the crankarm are spaced a distance greater than the external transverse dimension of the oblong piston. This structure permits the oblong piston to move between the arms upon reciprocation of the piston in the cylinder. The heretofore conventional pistons overlap the crankarm.

The distance between the center axes of the wrist pin and the crankarm bearing is greater than the radius of the crankarm throw.

Description of the preferred embodiment

Figures 1, 2, 3:
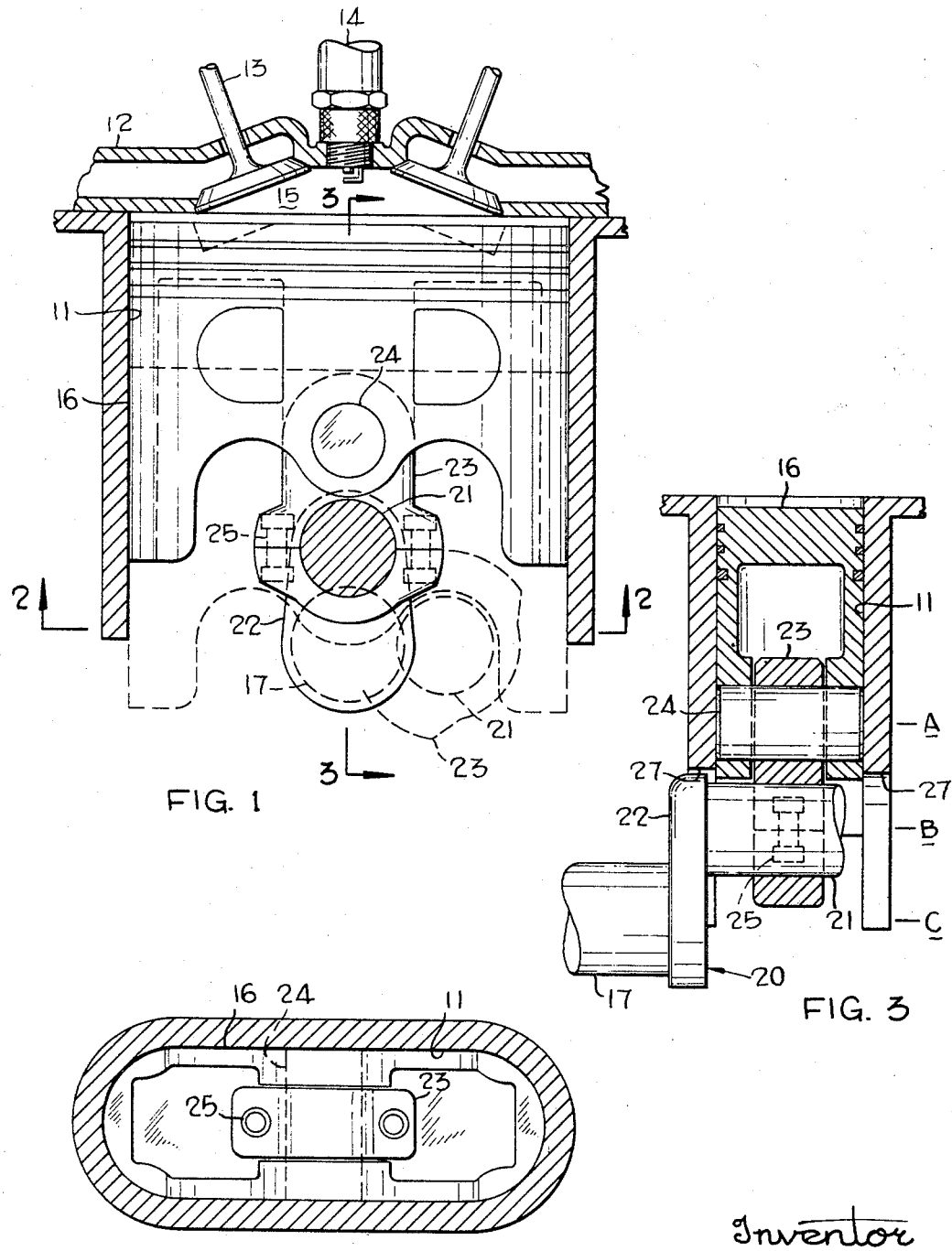
FIG. 1 is a vertical section through an internal combustion engine taken through one of the cylinders, the piston being illustrated at DTC (dead top center)
FIG. 2 is a fragmentary, cross section view taken on line 2—2 of FIG. 1.
FIG. 3 is a fragmentary, cross section view taken on line 3—3 of FIG. 1, one arm of the crankarm being omitted for clarity.

Referring now by characters of reference to the drawing, and first to FIG. 1, it will be understood that the internal combustion engine includes a block (not shown) having a cylinder 11 of substantially oblong cross section. The top of the cylinder 11 is closed by a head 12 carrying the valves 13 and sparkplug 14. The head 12 is shaped to form the combustion chamber 15. Reciprocatively mounted within the cylinder 11 is a compatible oblong piston 16. The piston 16 has an oblong configuration that matches the oblong shape of cylinder 11.

Extending longitudinally in the engine block is a rotatively mounted crankshaft 17, the center axis of which is designated by the reference character C. The crankshaft 17 provides a crankarm generally referred to by 20 and a crankarm bearing 21. The crankarm 20 includes a pair of spaced arms 22, one of which is omitted in FIG. 2 for clarity of drawing, between which the crank arm bearing 21 extends and to which the crankarm bearing 21 is fixed. For reasons which will later appear, the arms 22 are spaced a distance slightly greater than the external transverse dimension of the oblong piston 16. The center axis of the crankarm bearing 21 is designated by reference character B.

Oscillatively mounted on the crankarm bearing 21 is a short connecting rod 23. A wrist pin 24 is carried by and extends transversely of the oblong piston 16. The wrist pin 24 oscillatively mounts and connects the rod 23 to the piston 16. The center axis of the wrist pin 24 is designated by the reference character A. The center axis of the wrist pin 24 and the center axis B of the crankarm bearing 21 are eccentric. The distance between the center axis A of the wrist pin 24 and the center axis B of the crankarm bearing 21 is the effective length of the connecting rod 23. The distance between the center axis B of the crankarm bearing 21 and the center axis C of the crankshaft 17 represents the crankarm radius or throw. The distance between the center axes A and B is greater than the distance between the center axes B and C.

The connecting rod 23 is split into two parts joined together in a plane through the center axis B of the crankarm bearing 21 to facilitate assembly. A plurality of cap screws 25, one on each side of the crankarm bearing 21, interconnect the two rod parts.

The opposite sides of the piston 16, to which the wrist pin 24 is attached, are recessed immediately below and at each side of the wrist pin 24. These side recesses 26 provide a bottom margin closely adjacent the wrist pin 24. Preferably, the wrist pin 24 is located as close to the bottom margin as is possible and yet provide sufficient strength for the wrist pin mounting. Also, the crankarm bearing 21 is located as close as possible to the bottom margin, preferably with only minimum clearance, immediately below the wrist pin 24 when the crankarm bearing 21 is located in the DTC position. The side recesses 26 receive and pass the crankarm bearing 21 upon crankshaft rotation. The internal longitudinal dimension of oblong piston 16 is adequate to pass the crankarm bearing 21 and connecting rod 23 without obstruction.

As is shown in FIG. 3, the opposite sides of oblong cylinder 11 are cut away to provide recesses 27 to receive the arms 22 of the crankarm 20. As the oblong piston reciprocates in the cylinder 11, the piston 16 moves in the space between the arms 22 of the crankarm 20.

The described crankshaft and oblong piston-cylinder construction achieves the shortest possible effective connecting rod length using a conventional type of connecting rod with all of the resultant functional advantages.

It is thought that the functional advantages have become fully apparent from the foregoing detailed description of parts, but for completeness of disclosure, a brief description of the operation will be given.

The component parts of the crankshaft mechanism assume the positions illustrated in FIGS. 1 and 2 when the piston 16 is located at DTC. As the piston 16 moves downwardly in the cylinder 11, the crankarm bearing 21 rotates in a clockwise direction, as for example, from the DTC position shown in full lines in FIG. 1 to the 90° past DTC shown by broken lines in FIG. 1. The crankarm bearing 21 passes freely into the side recesses 26 as the oblong piston 16 moves downwardly between the arms 22 of the crankarm 20. The connecting rod 23 will turn about the crankarm bearing 21 and will turn freely in a counter-clockwise direction on the wrist pin 24. Upon continued downward movement of the piston 16, the crankshaft 17 will rotate and the crankarm bearing 21 will move to 180° past DTC, at which point the connecting rod will have turned in a clockwise direction on the wrist pin 24 back to the initial position shown in FIG. 1.

As the piston 16 moves upwardly within the cylinder 11, the crankshaft 17 will continue to move in a clockwise direction, thereby causing the connecting rod 23 to turn about the crankarm bearing 21 and in a clockwise direction on the wrist pin 24. Upon continued rotation of the crankshaft 17, as the crankarm bearing 21 approaches the DTC position shown in FIG. 1, the connecting rod 23 will turn in a counter-clockwise direction on the wrist pin 24 back to its initial position shown in FIG. 1. Also, the crankarm bearing 21 moves freely into the side recesses 26 of the piston 16 at the opposite side of wrist pin 24 as the piston 16 moves upwardly between the arms 22 of the crankarm 20. It will be understood that the connecting rod 23 will oscillate between limits on the crankarm bearing 21 and on the wrist pin 24 during each cycle of crankshaft rotation.

100% of the piston thrust is transmitted into torque at about 50° past DTC. In the heretofore conventional engines, maximum accelerated piston travel and 100% of piston thrust is transmitted into torque at approximately 75° past DTC. It can be shown, strokes being equal, that the subject crankshaft mechanism will provide from 40% or more faster piston speed and from 40% or more torque from 1° to about 50° of the power stroke than that of the heretofore conventional engines.

Again, it is pointed out, from 1° to about 50° past DTC, which in high compression engines is sufficient range for expending effective pressures, that the shorter rod action made possible through the subject crankshaft mechanism, will provide about 40% or more torque than that of heretofore conventional engines with conventionally longer rods.

Perhaps some of the advantages of the present crankshaft mechanism can be better understood if it is realized that in an engine utilizing a 3½-inch stroke, for example, the heretofore conventional engine structure requires a minimum rod length of approximately 6 to 7 inches. With the present invention, the rod length can be only 1⁷⁄₁₆ inches.

I claim as my invention:
1. In an internal combustion engine:
  (a) an oblong cylinder,
  (b) an oblong piston reciprocatively mounted in the cylinder,
  (c) a crankshaft including a crankarm having a crankarm bearing,
  (d) a connecting rod oscillatively mounted and connected to the crankarm bearing, the crankarm bearing being located closely adjacent the bottom of the oblong piston, immediately below the wrist pin when the crankarm bearing is in the dead top center position,
  (e) a wrist pin carried by and extending transversely of the oblong piston, the wrist pin oscillatively mounting and connecting the rod to the oblong piston,
  (f) the center axes of the wrist pin and crankarm bearing being eccentric,
  (g) the distance between the center axis of the wrist pin and the center axis of the crankarm bearing being greater than the distance between the center axis of the crankarm bearing and the center axis of the crankshaft, and
  (h) the center axis of the wrist pin being located between the center axis of the crankarm bearing and the top of the piston at all times during rotation of the crankshaft.
2. An internal combustion engine as defined in claim 1, in which:
  (i) the oblong piston includes a bottom margin closely adjacent the wrist pin, and
  (j) the crankarm bearing is located closely adjacent the piston bottom margin to achieve a short connecting rod length.

3. An internal combustion engine as defined in claim 1, in which:
   (i) the oblong piston has the piston sides, receiving the wrist pin, recessed to provide bottom side margins closely adjacent the wrist pin, and recessed on each side of the wrist pin to receive the crankarm bearing upon crankshaft rotation, and
   (j) the crankarm bearing is located closely adjacent the bottom side margins to achieve a short connecting rod length.

4. An internal combustion engine as defined in claim 3, in which:
   (k) the oblong piston has an internal longitudinal dimension adequate to clear the crankarm bearing and connecting rod upon crankshaft rotation.

5. An internal combustion engine as defined in claim 1, in which:
   (i) the crankarm bearing is located with minimum clearance with the bottom of the piston.

6. An internal combustion engine as defined in claim 1, in which:
   (i) the oblong piston includes a bottom margin close to the wrist pin, and
   (j) the crankarm bearing is located with minimum clearance with the bottom of the piston, whereby to achieve the shortest possible connecting rod length.

7. An internal combustion engine as defined in claim 6, in which:
   (k) the oblong piston is recessed on each side of the wrist pin to receive and pass the crankarm bearing upon crankshaft rotation, and
   (l) the oblong piston has an internal longitudinal dimension adequate to clear the crankarm bearing and connecting rod upon crankshaft rotation.

8. An internal combustion engine as defined in claim 1, in which:
   (i) the crankarm includes a pair of spaced arms between which the crankarm bearing extends and to which the crankarm bearing is fixed, the arms being spaced a distance greater than the external transverse dimension of the oblong piston,
   (j) the oblong piston is recessed adjacent the wrist pin to receive and pass the crankarm bearing upon crankshaft rotation, and
   (k) the oblong piston moves between the arms of the crankarm upon reciprocation of the piston in the cylinder.

9. An internal combustion engine as defined in claim 8, in which:
   (l) the cylinder is recessed on opposite sides to receive and pass the arms of the crankarm.

10. An internal combustion engine as defined in claim 1, in which:
    (i) the crankarm bearing is located closely adjacent the bottom of the piston,
    (j) the oblong piston is recessed on opposite sides adjacent the wrist pin to receive and pass the crankarm bearing, and
    (k) the crankarm includes a pair of spaced arms to which the crankarm bearing is fixed, the arms being spaced sufficiently to allow the piston to move therebetween as the crankshaft rotates upon piston reciprocation.

11. An internal combustion engine as defined in claim 10, in which:
    (l) the wrist pin is located close to the bottom of the piston, and
    (m) the crankarm bearing is located closely adjacent the bottom of the piston with minimum clearance to achieve the shortest possible connecting rod length.

12. An internal combustion engine as defined in claim 11, in which:
    (n) the arms of the crankarm are spaced a distance greater than the external transverse dimension of the oblong piston.

13. An internal combustion engine as defined in claim 12, in which:
    (o) the oblong piston has an internal longitudinal dimension adequate to clear the crankarm bearing and connecting rod upon crankshaft rotation, and
    (p) the cylinder is recessed at opposite sides to receive and pass the arms of the crankarm.

References Cited

UNITED STATES PATENTS

| | | | |
|---|---|---|---|
| 684,745 | 10/1901 | Carey | 123—197 |
| 1,280,058 | 9/1918 | Martin | 123—197 |
| 1,625,654 | 4/1927 | Hansen | 92—177 |
| 1,718,070 | 6/1929 | Peters | 92—177 XR |
| 1,728,514 | 9/1929 | Snyder | 92—177 XR |
| 2,257,417 | 9/1941 | Kelley | 92—177 XR |
| 2,368,412 | 1/1945 | Cords | 92—177 XR |
| 2,409,555 | 10/1946 | Gadoux et al. | 92—177 XR |

FOREIGN PATENTS

| | | |
|---|---|---|
| 569,020 | 5/1945 | Great Britain. |
| 978,679 | 12/1964 | Great Britain. |
| 495,760 | 6/1954 | Italy. |

WENDELL E. BURNS, *Primary Examiner.*

U.S. Cl. X.R.

74—25, 49; 92—177, 186; 123—193